United States Patent
Hegarty et al.

(10) Patent No.: US 10,140,119 B2
(45) Date of Patent: Nov. 27, 2018

(54) MODULAR SERIALIZATION

(71) Applicant: Oracle International Corporation, Redwood Shores, CA (US)

(72) Inventors: Chris Hegarty, Dublin (IE); Alexander R. Buckley, Cupertino, CA (US); Mark B. Reinhold, Menlo Park, CA (US); Alan Bateman, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 15/073,548

(22) Filed: Mar. 17, 2016

(65) Prior Publication Data

US 2017/0269929 A1    Sep. 21, 2017

(51) Int. Cl.
G06F 9/44 (2018.01)
G06F 8/70 (2018.01)
G06F 8/41 (2018.01)
G06F 9/445 (2018.01)

(52) U.S. Cl.
CPC ............... G06F 8/70 (2013.01); G06F 8/41 (2013.01); G06F 9/445 (2013.01)

(58) Field of Classification Search
CPC ... G06F 8/30; G06F 8/42; G06F 8/312; G06F 8/433; G06F 9/443; G06F 17/2725
See application file for complete search history.

(56) References Cited

U.S. PATENT DOCUMENTS

| | | | | |
|---|---|---|---|---|
| 6,298,353 | B1* | 10/2001 | Apte | G06F 8/71 |
| 6,757,887 | B1* | 6/2004 | Kaplan | G06F 8/36 |
| | | | | 714/38.1 |
| 7,325,226 | B2* | 1/2008 | Pepin | G06F 9/4433 |
| | | | | 717/108 |
| 9,430,200 | B1* | 8/2016 | Trofin | G06F 8/443 |
| 9,690,709 | B2 | 6/2017 | Sandoz et al. | |
| 2004/0255268 | A1* | 12/2004 | Meijer | G06F 8/447 |
| | | | | 717/106 |
| 2017/0039043 | A1 | 2/2017 | Haupt et al. | |
| 2017/0061148 | A1 | 3/2017 | Buckley et al. | |
| 2017/0063874 | A1 | 3/2017 | Buckley et al. | |
| 2017/0286065 | A1 | 10/2017 | Zhou et al. | |

OTHER PUBLICATIONS

TrossBach, "First steps with Java 9 and Project Jigsaw—Part 1", Nov. 24, 2015, codecentric Blog, pp. 11.*

* cited by examiner

Primary Examiner — Duy Khuong T Nguyen
(74) Attorney, Agent, or Firm — Invoke

(57) ABSTRACT

A serial form of a serializable exposed first module element of a module in a module system is analyzed. An unexposed and/or inaccessible second module element expressed in the serial form is identified as a potential error condition. A corrective execution is executed and/or a warning is presented.

23 Claims, 6 Drawing Sheets

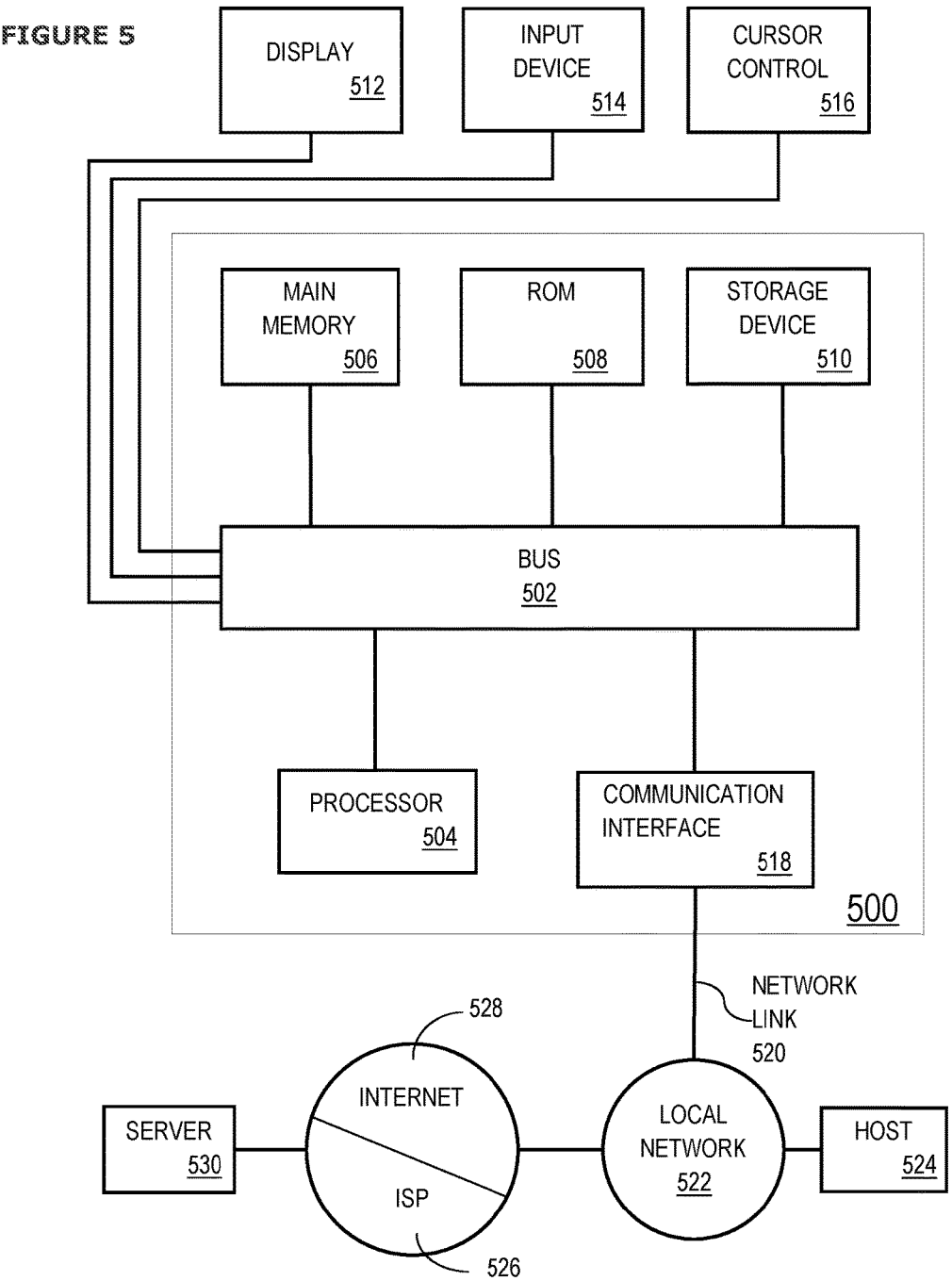

MODULAR SERIALIZATION

TECHNICAL FIELD

The present disclosure relates to module systems. In particular, the present disclosure relates to modular serialization.

BACKGROUND

A module system permits the definition of a set of modules. Each module in a module system corresponds to a respective collection of code. A module system specifies how a collection of code corresponding to a particular module can access code corresponding to other modules. A module descriptor (interchangeably referred to as a "module interface"), for a particular module, expresses other modules upon which the particular module may depend. The declaration of a dependency on another module may be referred to as an explicit dependency. A module descriptor also expresses the elements of a particular module that are exposed by the particular module to the other modules which may declare an explicit dependency on the particular module.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates a system in accordance with one or more embodiments.

DETAILED DESCRIPTION

Figure 1:
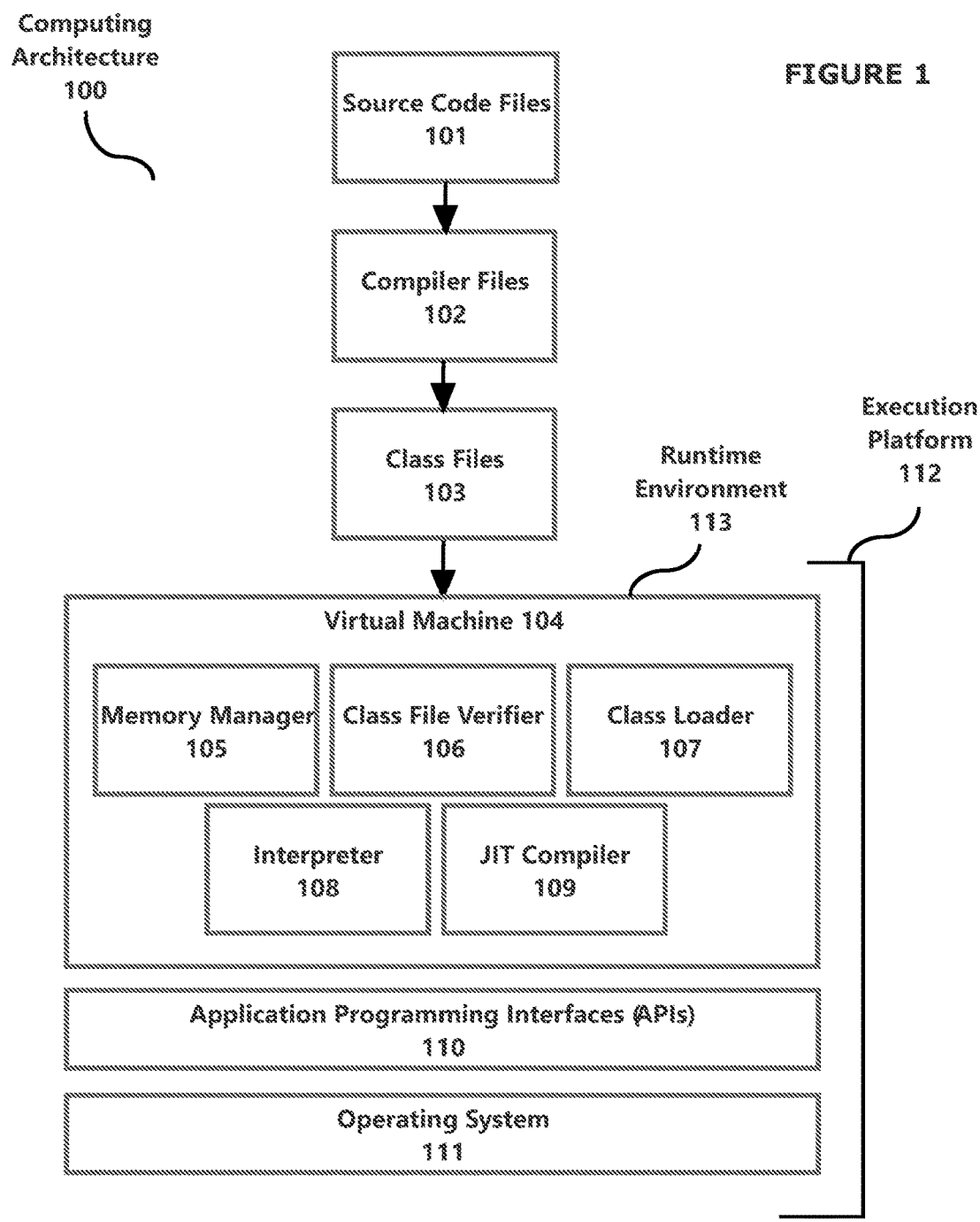
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

"One or more of [A] or [B]" as referred to herein is disjunctive. "One or more of [A] or [B]" is true if: [A] is true and [B] is false, [A] is false and [B] is true, or both [A] and [B] are true.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULE ELEMENTS OF A MODULE IN A MODULE SYSTEM
4. OPERATIONS WHICH MAY REQUIRE ACCESSING A MODULE ELEMENT OF A PROVIDER MODULE BY A CONSUMER MODULE
5. IDENTIFYING A POTENTIAL ERROR CONDITION IN WHICH AN OPERATION ACCESSING AN UNEXPOSED AND/OR INACCESSIBLE MODULE ELEMENT, OF A PROVIDER MODULE, MAY BE ATTEMPTED BY A CONSUMER MODULE
6. MISCELLANEOUS; EXTENSIONS
7. HARDWARE OVERVIEW

1. General Overview

A particular module element may be instantiated to generate an object of the particular module element type. This object is a serializable object if the particular module element is serializable. Serialization of the object generates a serialized form of the object which includes a series of bytes. The series of bytes can be used (with the declaration of the particular module element) in a deserialization process to reconstruct the object. The serialized form of the object may include (a) the particular module element type, (b) the object's data, and (c) the module element types of the object's data.

A particular module element may be associated with a descriptor, referred to herein as a module element descriptor. A module element descriptor includes information about the module element. A serialized module element descriptor provides information about objects of the module element type. Even though the serialized module element descriptor provides information about objects of the module element type, the serialized module element descriptor may be generated without the use of any object of the particular module element type. As an example, the particular module element corresponds to a class X. Class X may be associated with a class descriptor. A serialized class descriptor may be generated, using the class descriptor, without generating or using any objects of the type class X.

Embodiments herein refer to a serial form of a module element. The embodiments referring to a serial form of a module element may be applicable to (a) a serialized module element descriptor and/or (b) a serialized form of an object of the module element type. As an example, operations related to a serial from of a class X, as described herein, may be applicable to (a) a serialized class descriptor corresponding to class X and/or (b) a serialized form of an object of the type class X.

One or more embodiments include presenting warnings and/or executing corrective actions when a module element, of a provider module, (a) meets certain criteria and (b) is not accessible (e.g., not exposed) to a consumer module. In an example, a provider module exposes a first module element, that is serializable, to a consumer module. However, the provider module does not expose a second module element expressed in a serial form of the first module element. Responsive to determining that (a) the second module element is expressed in the serial form of the exposed first module element and (b) the second module element is not exposed (thus not accessible) to the consumer module, a warning may be presented and/or a corrective action may be executed. Determining that the second module element is expressed in the serial form of the exposed first module element may include determining that the second module element is expressed in a serialized first module element descriptor (e.g., a serialized class descriptor) corresponding to the first module element.

Additional module elements found recursively (e.g., via a serial form of the second module element) may be similarly checked for access by a consumer module. Warnings and/or corrective action may also be triggered based on an access modifier corresponding to (a) the module element being analyzed or (b) any other module element that directly or indirectly includes the module element being analyzed.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
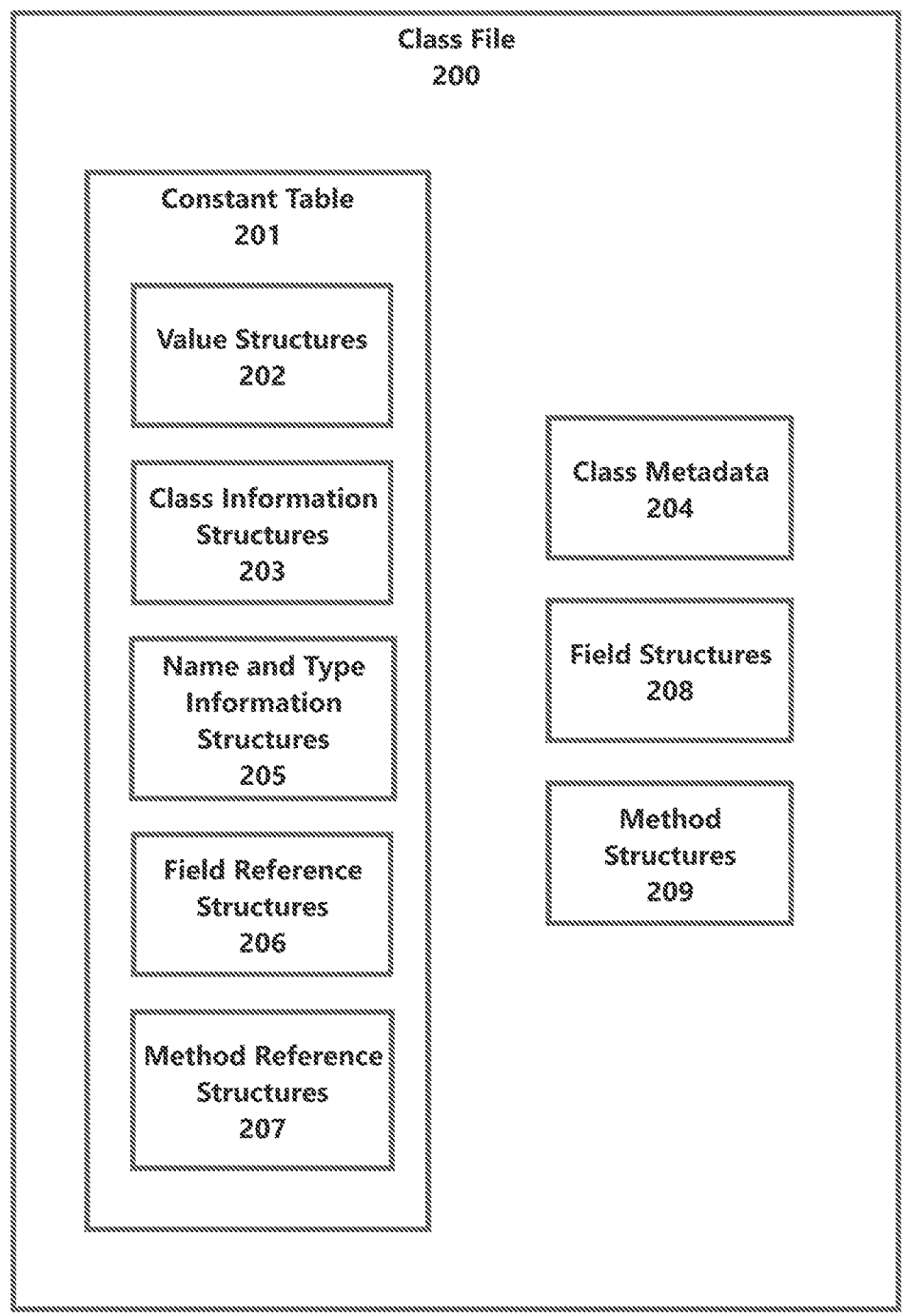
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 is made up of class members including, but not limited to, a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, non-public, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, non-public, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, non-public, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g.

"L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
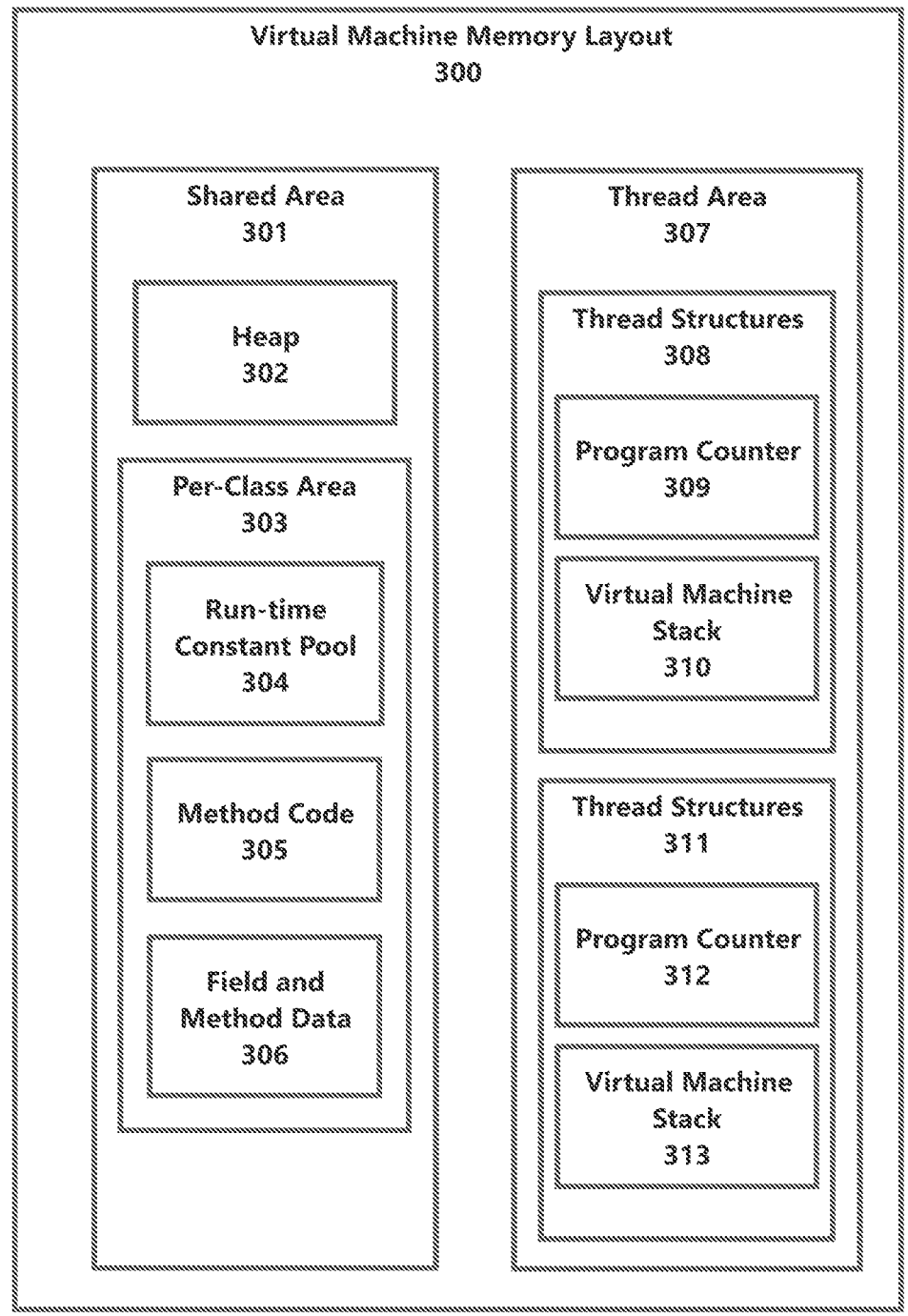
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Module Elements of a Module in a Module System

One or more embodiments are applicable to a module system. Each module within a module system corresponds to a respective set of code (referred to as "module code"). Each module is associated with one or more module elements. A module element, as referred to herein, corresponds to a portion of the module code. A module element (portion of module code) may itself include additional module elements (sub-portions of module code).

Module systems implemented in different programming languages may be defined with different types of module elements. Some examples, described herein, refer to the specific module elements of a module in a Java Module System for purposes of explanation. However, embodiments are equally applicable to module elements of different types in module systems implemented in other programming languages.

In the Java Module System, each module includes one or more packages. Each package includes one or more classes. Each class includes one or more class members such as fields and methods. Methods, as referred to herein, include constructors which may be invoked for the creation of an object by instantiating classes. A module element, as referred to herein with respect to the Java Module System, may include a package, a class, or a class member.

Exposing Module Elements

In an embodiment, a module element of a module may or may not be exposed to another module. In the Java Module System, a package may be exposed by a module when a module descriptor, corresponding to the module, includes an "exports" expression with the package identified as a parameter. The package may be exported to a set of specified modules (referred to as "qualified export") or to all other modules in the module system (referred to as "unqualified export").

The module element, of a provider module, may be exposed to a consumer module by the provider module if any of a set of conditions are met. The set of conditions may include, but are not limited to (a) a declaration within the descriptor of the provider module that exposes the module element to the consumer module via a qualified or unqualified export, (b) a user instruction received via an interface (e.g., a command line interface), (c) a determination by the run-time environment based on detection of a triggering event associated with permissions for exposing the module element, or (d) any other instruction that instructs a module system to expose the module element.

A particular module element may be exposed by exposing of the particular module element itself or by exposing another module element which includes the declaration of the particular module element. In one example, a class may be exposed by exposing a package which includes the class. Class members of the class are also exposed by exposing of the package which includes the class.

One or more embodiments relate to accessing module elements of a module in a module system. The module attempting the access is referred to herein as a consumer module and the module being accessed is referred to herein as a provider module. A module may function as either a consumer module or provider module for different access operations.

In an embodiment, determining whether a module element of a provider module may be accessed by a consumer module is based, at least in part, on whether the module element in the provider module as been exposed to the consumer module. Access controls which determine whether a module element of a provider module can be accessed by a consumer module are further described in Section 5. "Controlling Access to Module Elements."

Access Modifiers for Module Elements

In an embodiment, a module element is declared with an access modifier. The access modifier identifies an accessibility configuration of the module element. The accessibility configuration declares that the module element is (a) publicly accessible or (b) not publicly accessible. In one example, the modifier "public" indicates that a module element is publicly accessible and the modifier "private" indicates that the module element is not publicly accessible. However, the declared access modifier does not by itself control whether the module element is accessible or inaccessible from outside of the module. Access controls which determine whether a module element of a provider module can be accessed by a consumer module are further described in Section 5. "Controlling Access to Module Elements."

4. Operations which May Require Accessing a Module Element of a Provider Module by a Consumer Module In an embodiment, different kinds of operations require access to a module element of a provider module by a consumer module. Operations may be performed on byte code to enumerate, analyze, and/or categorize sections of the byte code. Some examples of operations for accessing module elements include reflection operations identified in the Java reflection API.

In an embodiment, an operation includes getting or setting a value of a module element where (a) the module element represents a field, (b) the getting or setting is performed with respect to an object, and (c) the object is an instance of another module element (e.g., a class which includes the field). An example set of operations include, but are not limited to:

(a) getField(String name): Returns a Field object that reflects the specified field of the class or interface represented by the Class object upon which the command is executed.

(b) getFields( ): Returns an array containing Field objects reflecting all the fields of the class or interface represented by the Class object upon which the command is executed.

(c) getDeclaredFields( ): Returns an array of Field objects reflecting all the fields declared by the class or interface represented by the Class object upon which the command is executed.

(d) getSuperclass( ): Returns the Class representing the superclass of the entity (class, interface, primitive type or void) represented by the Class upon which the command is executed.

(e) set(Object obj, Object value): Sets the value of the field represented by the Field object upon which the command is executed, on the specified object argument to the specified new value.

(f) get(Object obj): Returns the value of the field represented by the Field upon which the command is executed, on the specified object.

In an embodiment, an operation includes a consumer module invoking the module element of a provider module. Module elements which are methods may be invoked with or without reflection techniques. One example command for invoking a method using reflection includes java.lang.reflect.Method.invoke( ). The first argument is the object instance on which a particular method is to be invoked. If the method is static, the first argument may be null. Subsequent arguments are the method's parameters.

In an embodiment, an operation includes a consumer module attempting to access (a) an exposed first module element of a provider module and (b) a second module element, of the provider module, expressed in a serialized form of an object of the first module element type. An error may occur if the second module element is not exposed to the consumer module.

In an example, a class Spaceship is a first module element in a provider module. The class Spaceship is serializable. The class Spaceship includes a second module element which is a field planetsToVisit (of type java.util.ArrayList). A separate class CommandCenter is a module element in a consumer module. The provider module exposes the class Spaceship to the consumer module.

The consumer module may trigger generation of a serial form of the class Spaceship and receive the serial form of the class Spaceship (e.g., a serialized class descriptor corresponding to the class Spaceship). The serial form of class Spaceship may be received by the consumer module from the provider module or from another module. The serial form of class Spaceship may be referred to herein as a "stream".

The serial form of the first module element may express, but is not limited to expressing: (a) a type of the first module element, (b) a supertype of the first module element type, and (c) a particular set of module elements corresponding to the fields in an object of the first module element type that have not been declared as transient. In this example, the serial form of the class Spaceship expresses the field planetsToVisit (of type java.util.ArrayList). Furthermore, the serial form of java.util.ArrayList expresses planet names (of type String).

During the deserialization process, the fields of serializable classes will be restored from the stream. In one example, a readObject method is responsible for reading from the stream and restoring the classes' fields. The readObject method may call another method defaultReadObject to invoke a default mechanism for restoring the object's non-transient fields. The defaultReadObject method uses information in the stream to assign the fields of the object saved in the stream with the correspondingly named fields in the current object.

In the above example, the class CommandCenter of the consumer module may attempt to execute a deserialization operation to restore an object of type Spaceship. Restoring an object of type Spaceship includes restoring a non-transient field, planetsToVisit, of an object of type Spaceship. The serial form of class Spaceship expresses the field planetsToVisit (of type java.util.ArrayList). During the deserialization process, the values of the field planetsToVisit may be listed. The deserialization operation may require accessing the type java.util.ArrayList expressed in the serial form of class Spaceship. In order for the deserialization operation to execute successfully, java.util.ArrayList must be exposed to the consumer module. If java.util.ArrayList is not exposed to the consumer module, then the attempt to execute the deserialization operation may result in an error. In order to avoid this type of error, unexposed module elements expressed in a serial form of an exposed serializable module element need to be identified. Unexposed module elements expressed in a serial form of an exposed serializable module element may be identified, for example, based on an analysis of a serialized module element descriptor corresponding to the exposed serializable module element.

One or more embodiments include (a) identifying unexposed module elements expressed in a serial form of an exposed serializable module element and (b) executing a corrective action and/or presenting a warning. One or more embodiments include (a) identifying inaccessible module elements expressed in a serial form of an exposed serializable module element and (b) executing a corrective action and/or presenting a warning.

5. Identifying a Potential Error Condition in which an Operation Accessing an Unexposed and/or Inaccessible Module Element, of a Provider Module, May be Attempted by a Consumer Module As noted above, one or more operations require access to a module element of a provider module by a consumer module. A consumer module executing an operation which accesses an unexposed module element expressed in a serial form of an exposed module element may result in an error. One or more embodiments include (a) identifying unexposed module elements expressed in a serial form of an exposed serializable module element and (b) executing a corrective action and/or presenting a warning. Embodiments further include recursively identifying unexposed module elements that may be referenced directly or indirectly via a serial form of an exposed module element.

Figure 4A:
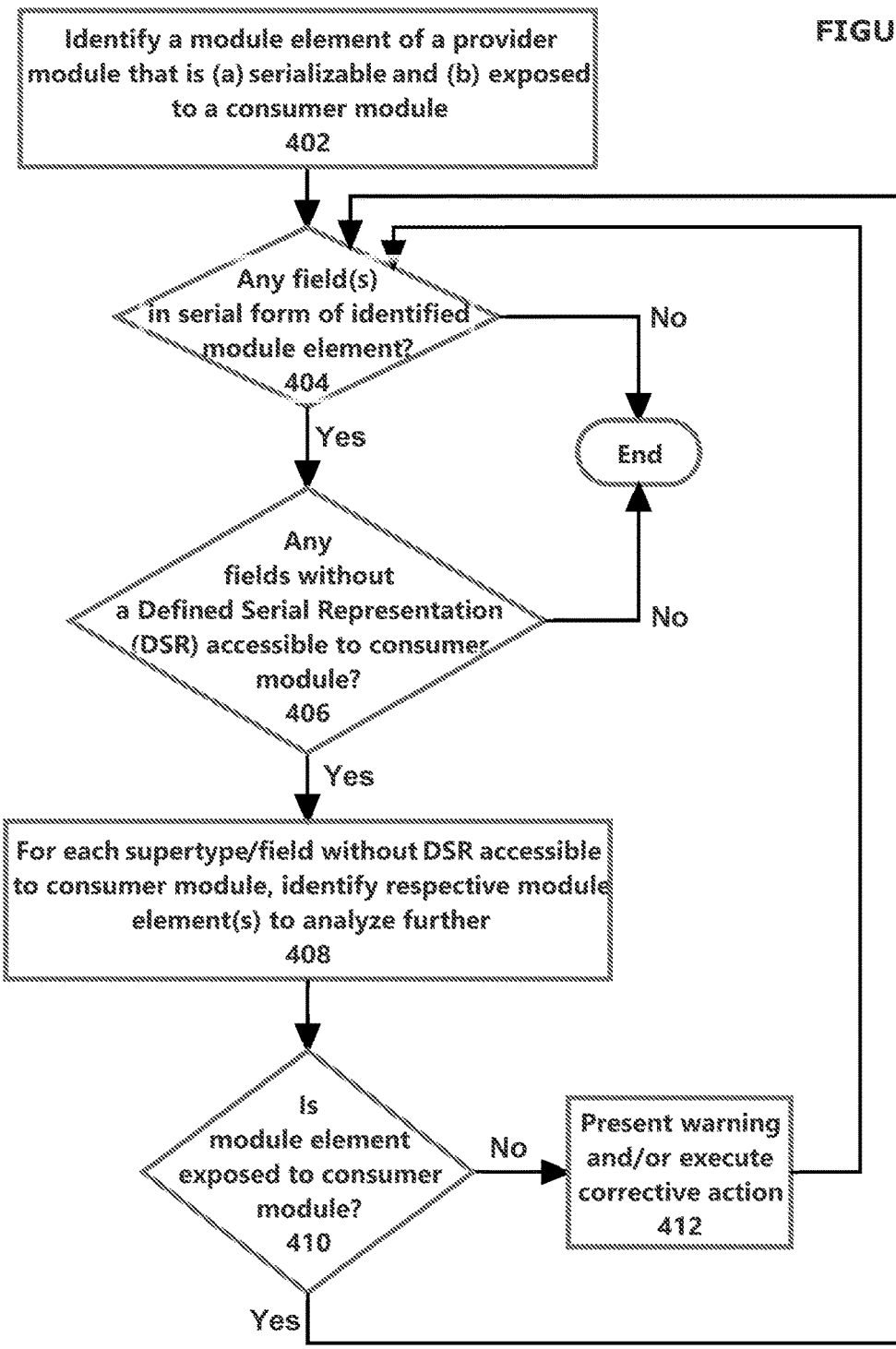
FIGS. 4A-4B illustrate operations in accordance with one or more embodiments.
Figure 4B:
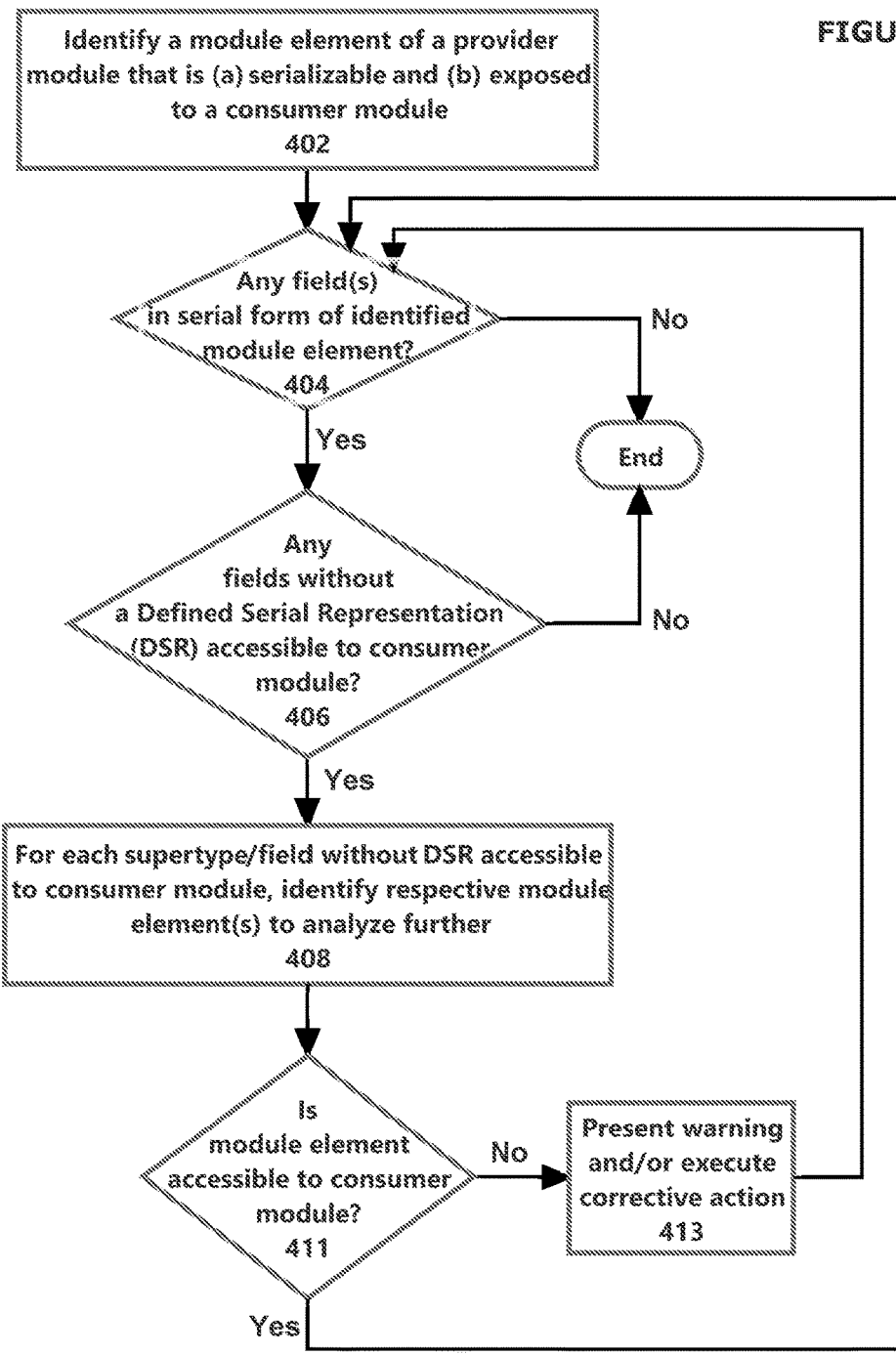

FIGS. 4A and 4B illustrates an example set of steps for identifying potential error conditions. Steps described below with reference to FIGS. 4A and 4B may be performed prior to and/or during runtime. For example, the steps may be performed by a compiler or by a runtime environment. Steps described below with reference to FIGS. 4A and 4B may be rearranged, omitted, or modified. Additional steps, not described below, may be performed instead of or in addition to the described steps. Accordingly, the steps as recited below should not be construed to limit the scope of any of the claims recited herein.

One or more embodiments include identifying a module element of a provider module that is (a) serializable and (b) exposed to a consumer module (Operation 402). A compiler may determine a set of module elements exposed by a first module ("provider module") to at least one other module ("consumer module"). One or more of the set of module elements may be exposed using a qualified export which exports to a specific consumer module. One or more of the set of module elements may be exposed using an unqualified export that does not identify any specific consumer module. A particular module element may be determined to be exposed if the module, which includes the declaration of the particular module element, exposes the particular module element. The particular module element may also be determined to be exposed if the module exposes another module element (e.g., a package) which includes the declaration of the particular module element (e.g., a class) as described in detail above.

The compiler may determine that an exposed module element is serializable. A module element may be determined to be serializable if a particular function may be applied to the module element which results in obtaining information, such as structural information, about the module element (e.g., in a "serial form" described below) that is not available in an non-serialized version of the module element. Different compilers (e.g., corresponding to different programming languages) may define different requirements for determining whether this particular function may be applied to the module element. The particular function itself may also vary across different APIs.

In one example, which should not be construed as limiting the scope of the claims, a module element may be determined to be serializable if a particular function may be applied to the module element which results in obtain (a) a supertype of the module element being serialized and/or (b) a set of module elements (which have not been declared as transient) corresponding to the fields in an object of a type of the module element.

In the Java API, for example, serializability of a class is enabled by the class implementing the java.io.Serializable interface. Accordingly, a class implementing the java.io.Serializable interface is determined to be serializable. Classes that do not implement the java.io.Serializable interface are determined not to be serializable. In other APIs, other mechanisms may be used to check if any of the exposed module elements are serializable.

One or more embodiments include determining if there are any supertypes or fields, without a Defined Serial Representation (DSR) accessible to the consumer module, expressed in a serial form of an identified module element (Operations 404-406). Operations 404-406 may be repeated for each module element identified in Operation 402. As an example, module elements corresponding to fields of type int, long, double, float, byte, and string, as defined by the Java API, have a DSR in a serialization library that may be accessible to a consumer module. The user-defined class BankDetails as described in the detailed example below does not have a DSR.

Fields (and corresponding module elements) expressed in a serial form of the module element of the provider module (identified in Operation 402) may be referred to herein as being referenced "directly" in the serial form of the module element of the provider module. Fields (and corresponding module elements) expressed in a serial form of module elements identified in Operation 408 (described below) may be referred to herein as being referenced "indirectly" in the serial form of the module element of the provider module. Accordingly, a module element that is "indirectly" referenced in a serial form of the module element of the provider module is (a) not expressed in the serial form of the module element of the provider module and (b) expressed in a serial form of another module element identified via the recursive identification process of module elements in serial forms.

In an embodiment, a serial form of a module element includes a field corresponding to a supertype of the module element type. The supertypes of a type are all the interfaces and classes that are extended or implemented by that type. If type X extends or implements type Y, then X is a subtype of Y and Y is a supertype of X. Subtypes of a serializable class are themselves serializable. Accordingly, any module element, with a direct or indirect serializable supertype, is itself serializable.

One or more embodiments include determining if a module element(s), identified in Operation 408, is exposed to at the consumer module (Operation 410). Operation 410 may be repeated for each module element identified in Operation 408. As noted above, a particular module element may be exposed using a qualified export or an unqualified export. Furthermore, a particular module element may be directly exposed or indirectly exposed as a function of exposing another module element which includes the particular module element.

If any of the module elements, identified in Operation 408, are not exposed to the consumer module, then a warning is presented and/or a corrective action is executed (Operation 412). In one example, a corrective action includes removing the unexposed module element from a serial form of an exposed module element. The unexposed module element may be removed from the serial form of the exposed module element by declaring the module element as a "transient" module element. Other techniques known today or later developed for removing an unexposed module element from a serial form of an exposed module element may be implemented in accordance with one or more embodiments. In another example, a descriptor, corresponding to a module which includes the unexposed module element, may be modified to expose the previously unexposed module element. The module element may be exposed via an unqualified export or a qualified export. In another example, a software developer is presented with a compile-time error which identifies the unexposed module element that is expressed in the serial form of the exposed module element as a potential error condition. The compile-time error may be presented as a warning which does not necessarily have to be fixed or as an error which prevents successful compilation of the code. In another example, the exposed module element itself, which in a serial form expresses the unexposed module element, may be removed from the set of module elements being exposed. Specifically, a module descriptor may be modified to change the previously exposed module element to an unexposed module element. In another example, the exposed module element itself, which in a serial form expresses the unexposed module element, is modified from a serializable module element to a non-serializable module element. In one or more embodiments, a recursive analysis, beginning with Operation 404, is initiated for each of the module elements identified in Operation 408. The recursive analysis is continued until each last identified module element, in each logical path of module element identification, is a module element with (a) no fields in a serial form or (b) only fields in a serial form that have DSRs.

One or more embodiments include presenting a warning and/or executing a corrective action if a module element, identified in Operation 408, is not accessible to the consumer module. As illustrated in FIG. 4B, which is a slight modification of FIG. 4A, operation 411 includes determining whether the module element (identified in Operation 408) is accessible to the consumer module. Any accessibility level may be defined for triggering a warning or corrective action (Operation 413). In an embodiment, a warning is presented and/or a correction action is triggered in response to determining any of:

(a) Module element, identified in Operation 408, is declared with a non-public access modifier
(b) Module element, identified in Operation 408, is not declared with a public access modifier
(c) A second module element, which includes the module element identified in Operation 408, is declared with a non-public access modifier
(d) A second module element, which includes the module element identified in Operation 408, is not declared with a public access modifier The corrective action as referenced in Operation 413 may include, if applicable, corrective actions as described above with reference to Operation 412. Additionally or alternatively, the corrective action as referenced in Operation 413 may include, for example, modifying access modifiers corresponding to (a) a module element identified in Operation 408, or (b) a second module element which includes the module element identified in Operation 408. In an example, an access modifier for a module element, identified in Operation 408, may be changed from a "non-public" access modifier to a "public" access modifier.

6. Example Embodiments

The following example(s) is included to illustrate aspects of one or more embodiments. The example(s) may be over-simplified, incomplete, or otherwise deviate from other embodiments for purposes of explanation. The order of steps performed may be altered in other examples. The example(s) below is not to be misconstrued as limiting the scope of any of the claims.

In an example, a compiler checks for unexposed module elements that may be expressed in a serial form of an exposed module element. The compiler compiles a code set associated with a module system which includes a module M. Module M exposes a package, com.electric. Module M does not expose another package, com.electric.internal. Furthermore, Module M depends on a serialization library serialization.library which includes the serial representations of objects of type int and string. The module descriptor corresponding to module M may initially include:

```
module M {
  exports com.electric;
  requires serialization.library;
}
```

The package com.electric may include a declaration of a class Customer which is (a) serializable and (b) a subtype of a class Person (alternatively stated, the class Person is a supertype of class Customer). The package com.electric with class Customer may include:

```
package com.electric
public class Customer extends Person implements Serializable {
  private String name
  private String address
  private int number
  private BankDetails bankDetails
}
```

The package com.electric.internal may include a declaration of a class Person and a declaration of a class BankDetails both of which are serializable. The package com.electric.internal with class Person and class BankDetails may include:

```
package com.electric.internal
public class Person implements Serializable {
  String gender; // male or female
}
public class BankDetails implements Serializable {
  private String IBAN
  private String BIC
}
```

A serial form of class Customer (e.g., a serialized class descriptor corresponding to class Customer) may include:

```
[
  type:    com.electric.Customer,
  super:   [type: com.electric.internal.Person
           fields: gender=value ]
  fields:  name=value,
           address=value,
           number=value,
           bankDetails=
           [
           type: com.electric.internal.BankDetails,
           fields: IBAN=value,
           BIC=value
           ]
]
```

The compiler identifies an exposed module element, the package com.electric which includes the class Customer. Exposing the package com.electric exposes module elements declared within the package com.electric such as the class Customer. Furthermore, the compiler determines that the class Customer is a serializable class. Thus, the compiler determines that the class Customer is both exposed and serializable.

As a result of determining that the class Customer is both (a) exposed and (b) serializable, the compiler selects the class Customer as a module element to be recursively analyzed (see operations 402-412 above). The compiler begins recursive analysis on the supertype and fields that are expressed in a serial form of the class Customer.

The compiler identifies the supertype class Person of class Customer in the serial form of class Customer. The compiler selects class Person as a module element for analysis. Specifically, since the class Person is expressed in the serial form of class Customer, the compiler performs a check to ensure that the class Person is exposed to serialization.library which may need to access class Person. However, the compiler determines that the class Person is declared within the package com.electric.internal which has not been exposed by module M. As a result of determining that the module element class Person is an unexposed module element expressed in a serial form of a serializable, exposed module element class Customer, a warning is presented and/or a corrective action is executed. As noted above, many different corrective actions may be taken. In this example, the package com.electric.internal is exposed via a unqualified export by modifying the descriptor of module M to include:

```
module M {
  exports com.electric;
  exports com.electric.internal;
  requires serialization.library;
}
```

Alternatively, the package com.electric.internal may be exposed via a qualified export to serialization.library by modifying the descriptor of module M to include:

```
module M {
  exports com.electric;
  exports com.electric.internal to serialization.library;
  requires serialization.library;
}
```

Modifying module M to expose the class Person (by exposing the package com.electric.internal) removes the potential error condition: an unexposed module element expressed in a serial form of a serializable, exposed module element.

Continuing with the traversal of the serial form of class Customer, the compiler identifies the fields expressed in the serial form of class Customer. Specifically, the compiler identifies the fields name (of type String), address (of type String), number (of type int), and bankDetails (of type BankDetails). Since the types string and int have a defined serial representation in a serialization library accessible to consumer modules, further analysis is not needed on the corresponding classes string and int. Since the type Bank-Details does not have a defined serial representation in the serialization library, a further analysis is needed on the corresponding class BankDetails. Accordingly, the compiler selects class BankDetails as a module element for analysis. Specifically, the compiler performs a check to ensure that the class BankDetails is exposed to serialization.library which may need access to class BankDetails. The compiler determines that the class BankDetails is included in the package com.electric.internal which was exposed by modifying the descriptor of module M, as described above. Accordingly, class BankDetails is now exposed and does not require the presentation of a warning or execution of a corrective action.

In an alternate scenario, a warning is displayed in response to determining that the class Person was not exposed (the descriptor of module M is not modified to expose package com.electric.internal). In this alternate scenario, class BankDetails would be identified as an unexposed module element, expressed in a serial form of a serializable exposed module element, that would trigger (a) presentation of a warning and/or (b) execution of a corrective action.

As noted above, the analysis may be recursively performed for each identified module element. In the above example, the serial form of each of class Person and class BankDetails, which do not have DSRs, is analyzed. The serial form of Person is determined to include the field gender (of type string). As noted above, the type string has a defined serial representation in a serialization library accessible to all consumer modules and further analysis is not needed on the corresponding class string. The serial form of class BankDetails is determined to include the fields IBAN (of type string) and BIC (of type string). As noted above, a further analysis is not needed on the class string. The recursive analysis ends since each path that was traversed (paths corresponding to class Person and class Bank-Details) has resulted in identification of module elements that all have corresponding defined serial representations available to the consumer modules.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first module element, of a first module defined by a module system, in a set of code, wherein the first module element is (a) serializable and (b) exposed by the first module to at least one module defined by the module system;
   identifying a second module element, of a second module, that is expressed in a serial form of the first module element;
   determining, by a compiler or a runtime environment, that the second module element is not exposed by the first second module to the at least one module; and
   responsive to determining that the second module element is not exposed by the second module, performing one or more of: executing a corrective action or presenting a warning.

2. The medium of claim 1, wherein the operations further comprise:
   determining that a third module element, of a third module and expressed in a serial form of the second module element, is not exposed by the third module to the at least one module; and
   responsive to determining that the third module element is not exposed by the first third module, performing one or more of: executing a second corrective action or presenting a second warning.

3. The medium of claim 1, wherein the operations further comprise:
   recursively identifying a plurality of module elements that are (a) serializable and (b) expressed in at least one serial form derived directly or indirectly from the first module element;
   determining that a subset of one or more module elements, of the plurality of module elements, are not exposed to the at least one module; and
   responsive to determining that the subset of module elements are not exposed to the at least one module, performing one or more of: executing a second corrective action or presenting a second warning.

4. The medium of claim 1, wherein executing the corrective action comprises modifying the second module to expose the second module element to the at least one module.

5. The medium of claim 4, wherein the second module element is exposed via a qualified export to the at least one module.

6. The medium of claim 4, wherein the second module element is exposed via an unqualified export.

7. The medium of claim 1, wherein executing the corrective action comprises modifying the first module to no longer expose the first module element to the at least one module.

8. The medium of claim 1, wherein executing the corrective action comprises removing the second module element from the serial form of the first module element.

9. The medium of claim 8, wherein removing the second module element from the serial form of the first module element comprises marking the second module element, in the first module element, as a module element that is not to be included in the serial form of the first module element during a serialization process which generates the serial form of the first module element.

10. The medium of claim 1, wherein executing the corrective action comprises modifying the first module element from a serializable module element to a non-serializable module element.

11. The medium of claim 1, wherein the warning indicates one or more of:
    the second module element is not accessible to the at least one module;
    the second module element is not exposed to the at least one module;
    the second module element is to be exposed to the at least one module; and
    the first module element is to be non-serializable.

12. The medium of claim 1, wherein performing the executing operation or the presenting operation is further responsive to determining that the first module element is declared with a public access modifier.

13. The medium of claim 1, wherein performing the executing operation or the presenting operation is further responsive to determining that the second module element is of a particular type that is not associated with a predefined representation in serial form.

14. The medium of claim 1, wherein the second module element is a type.

15. The medium of claim 1, wherein the serial form is generated in response to one or more of:
    receiving a request which requires generating of the serial form of the first module element;
    receiving a request to execute code which requires the serial form of the first module element; and
    receiving a request to compile code which includes the second module element.

16. The medium of claim 1, wherein the second module is either same as or different from the first module.

17. A non-transitory computer readable medium comprising instructions which, when executed by one or more hardware processors, causes performance of operations comprising:
    identifying a first module element, of a first module defined by a module system, in a set of code, wherein the first module element is (a) serializable and (b) accessible by a second module defined by the module system;
    identifying a second module element expressed in a serial form of the first module element;
    determining, by a compiler or a runtime environment, that the second module element is not accessible by the second module; and
    responsive to determining that the second module element is not accessible by the second module, performing one or more of: executing a corrective action or presenting a warning.

18. The medium of claim 17, wherein determining that the second module element is not accessible by the second module comprises determining that the second module element is declared with a non-public access modifier.

19. The medium of claim 18, wherein the corrective action comprises modifying the non-public access modifier to a public access modifier.

20. The medium of claim 17, wherein the corrective action comprises removing the second module element from the serial form of the first module element.

21. The medium of claim 17, wherein the operations further comprise:
    determining that a third module element, expressed in a serial form of the second module element, is not accessible by the second module; and
    responsive to determining that the third module element is not accessible by the second module, performing one or more of: executing a second corrective action or presenting a second warning.

22. A method comprising:
    identifying a first module element, of a first module defined by a module system, in a set of code, wherein the first module element is (a) serializable and (b) exposed by the first module to at least one module defined by the module system;
    identifying a second module element, of a second module, that is expressed in a serial form of the first module element;
    determining, by a compiler or a runtime environment, that the second module element is not exposed by the second module to the at least one module;
    responsive to determining that the second module element is not exposed by the second module, performing one or more of: executing a corrective action or presenting a warning; and
    wherein the method is performed by at least one device including a hardware processor.

23. A system comprising:
    at least one device including a hardware processor;
    the system being configured to perform operations comprising:
    identifying a first module element, of a first module defined by a module system, in a set of code, wherein the first module element is (a) serializable and (b)

exposed by the first module to at least one module defined by the module system;

identifying a second module element, of a second module, that is expressed in a serial form of the first module element;

determining, by a compiler or a runtime environment, that the second module element is not exposed by the second module to the at least one module; and responsive to determining that the second module element is not exposed by the second module, performing one or more of: executing a corrective action or presenting a warning.

* * * * *

UNITED STATES PATENT AND TRADEMARK OFFICE
CERTIFICATE OF CORRECTION

PATENT NO. : 10,140,119 B2
APPLICATION NO. : 15/073548
DATED : November 27, 2018
INVENTOR(S) : Hegarty et al.

Page 1 of 1

It is certified that error appears in the above-identified patent and that said Letters Patent is hereby corrected as shown below:

In the Specification

In Column 17, Line 29, delete "string." and insert -- String. --, therefor.

In Column 19, Line 9, delete "string" and insert -- String --, therefor.

In Column 19, Line 12, delete "string" and insert -- String --, therefor.

In Column 19, Line 39, delete "string)." and insert -- String). --, therefor.

In Column 19, Line 39, delete "string" and insert -- String --, therefor.

In Column 19, Line 42, delete "string." and insert -- String. --, therefor.

In Column 19, Line 44, delete "string)" and insert -- String) --, therefor.

In Column 19, Line 44, delete "string)." and insert -- String). --, therefor.

In Column 19, Line 45, delete "string." and insert -- String. --, therefor.

In the Claims

In Column 22, Line 52, in Claim 1, after "the" delete "first".

In Column 22, Line 65, in Claim 2, after "the" delete "first".

Signed and Sealed this
Twenty-fourth Day of December, 2019

Andrei Iancu
*Director of the United States Patent and Trademark Office*